Oct. 18, 1927.
G. G. WESTERFIELD
1,645,839
CARRYING BAIL
Filed July 20, 1926
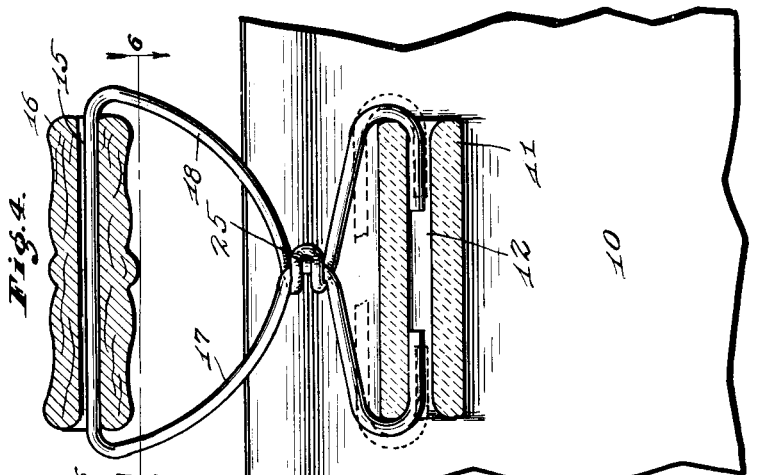
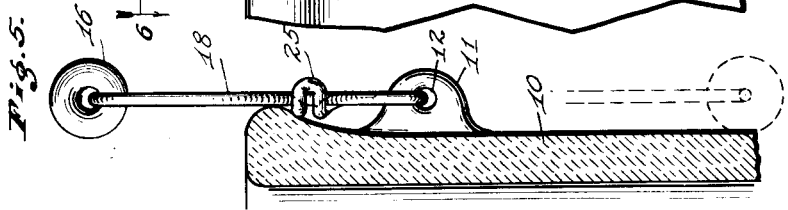
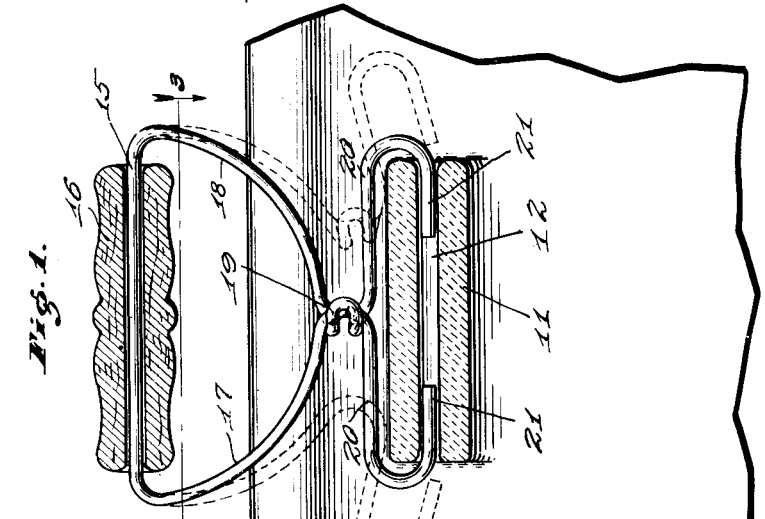
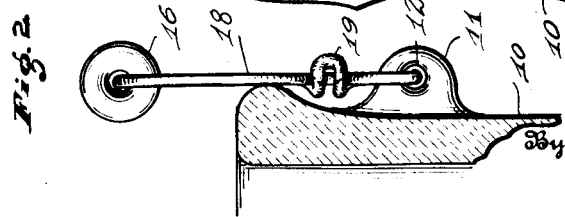

Patented Oct. 18, 1927.

1,645,839

UNITED STATES PATENT OFFICE.

GRANVILLE G. WESTERFIELD, OF INDIANAPOLIS, INDIANA.

CARRYING BAIL.

Application filed July 20, 1926. Serial No. 123,723.

It is the object of my invention to produce an improved handle or carrying bail for vessels or receptacles. More specifically, it is the object of my invention to produce a handle which will embody a minimum number of parts, which may be economically manufactured, which may readily be attached to a jar, and which when subjected to load will not tend to become separated from the jar.

I accomplish the above objects by forming my bail of a single piece of wire which may be provided centrally with a wooden handle member and which has its ends bent toward each other in position to enter the opposite ends of a hole extending through an ear on the jar to which the bail is applied. Between the handle and the in-bent ends, the sides of the bail are bent toward each other and provided with interengaging portions which when engaged will prevent removal of the bail-ends from the ear on the jar.

The accompanying drawing illustrates my invention: Fig. 1 is a side elevation of my bail in position on a jar, the bail-handle and the bail-ear being shown in section; Fig. 2 is an end elevation of the bail illustrated in Fig. 1; Fig. 3 is a section on the line 3—3 of Fig. 1; Fig. 4 is a side elevation similar to Fig. 1 illustrating a slightly modified form of bail; Fig. 5 is an end elevation of the bail shown in Fig. 4; and Fig. 6 is a section on the line 6—6 of Fig. 4.

Earthenware jars, or similar articles, of the type to which my invention is applicable are commonly provided at diametrically opposite points and near the top with ears to which may be attached bails or handles by which the jar may be lifted. Each bail-ear is usually provided either with a horizontal hole which extends through it or with horizontally extending recesses in its opposite ends.

In the construction shown in the drawings, the jar 10 is provided at diametrically opposite points with the bail-ears 11. As shown, each bail ear 11 has a hole 12 extending through it, but it will be evident that it is not necessary for such hole to extend completely through the ear.

My improved bail is preferably formed of a single piece of wire and comprises a central portion 15 which may be provided with a wooden handle member 16. Beyond the ends of the wooden handle member 16, the wire of the bail is bent to form re-entrant sides 17 and 18 which curve toward each other as is evident from Figs. 1 and 4. At the point where the bail-sides 17 and 18 meet, one of them, here shown as the side 18, is provided with a hook 19 conveniently formed integrally with the remainder of the bail, such hook being adapted to engage the side 17 as is clear from Fig. 3. Below the hook 19, the wire of the bail is bent to form horizontally extending portions 20, the ends 21 of which are bent toward each other to enter the ends of the hole 12 in the ear 11.

The bail illustrated in Figs. 1, 2, and 3 is of a type which may be readily removed from one jar and attached to another, and for this purpose the hook 19 is an open hook which may be disengaged from the side portion 17 of the bail, the bail-ear 11 being short enough to permit the necessary inward movement of the side portions 17 and 18.

The bail illustrated in Figs. 4, 5, and 6 is designed to be permanently attached to its associated jar. To this end, the side 18 is provided with a hook 25 similar to but possibly somewhat longer than the hook 19 of the bail illustrated in Figs. 1, 2, and 3. When the bail is in place on the jar with its ends inserted in the hole 12, the hook 25 may be closed as is clear from Fig. 6, thus preventing ready removal of the bail from the jar.

In attaching my bail to the jar 10, the bail is spread, as indicated in the dotted lines in Fig. 1, until the ends 21 are far enough apart to permit their passage over the ends of the ear 11. When the bail is then closed, the ends 21 enter the hole 12 in the ear 11, and the hook 19 or 25 is engaged with the opposite side 17 to hold the ends 21 in place. When the bail is in place and not subjected to load it occupies the position shown in full lines in Fig. 1. When the jar 10 is lifted by means of the bails, the lower end of the bails change their shape somewhat from the dotted line position to the full line position shown in Fig. 4. The horizontally extending portions 20 of the bail tend to rotate about their inner ends, which rotation causes the in-bent ends 21 of the bail to move inwardly in the hole 12 as is clear from Fig. 4. It is therefore evident that the bail is firmly seated in the bail-ear 11 when the jar 10 is lifted.

I claim as my invention:

1. A carrying bail adapted to be attached to a bail-ear on a receptacle to be carried, said bail being formed of a single piece of wire and comprising a handle portion and re-entrant sides, the ends of said wire being bent toward each other and adapted to enter holes in the ends of said ear, one of said re-entrant sides being formed with a hook which is adapted to engage the other re-entrant side and when so engaged to prevent removal of the bail from the bail-ear.

2. A carrying bail adapted to be attached to a bail-ear on a receptacle to be carried, said bail being formed of a single piece of wire and comprising a handle portion and re-entrant sides, the ends of said wire being bent toward each other substantially parallel with the adjacent portions of said re-entrant sides and adapted to enter holes in the ends of said ear, one of said re-entrant sides being formed with a hook which is adapted to engage the other re-entrant side and when so engaged to prevent removal of the bail from the bail-ear.

3. A carrying bail adapted to be attached to a bail-ear on a receptacle to be carried, said bail comprising a handle and re-entrant side portions formed of wire and having in-bent ends adapted to enter holes in the end of said ear, one of said side portions being formed with a hook which is adapted to engage the other re-entrant side and when so engaged to prevent removal of the bail from the bail-ear.

In witness whereof, I have hereunto set my hand at Indianapolis, Indiana, this 16th day of July, A. D. one thousand nine hundred and twenty six.

GRANVILLE G. WESTERFIELD.